United States Patent [19]

Ross

[11] 3,874,426

[45] Apr. 1, 1975

[54] CAN-FILLING METHOD FOR MEAT-CANNING PROCESS

[76] Inventor: Henry M. Ross, The Lawn Rt.2, Nokesville, Va. 22123

[22] Filed: Apr. 17, 1973

[21] Appl. No.: 352,071

[52] U.S. Cl................................ 141/11, 17/45
[51] Int. Cl.............................................. B65b 1/46
[58] Field of Search ............ 53/59 W; 141/1, 9, 13, 141/83, 94, 100, 103, 104, 196, 11, 69; 177/122, 123; 222/77; 17/33, 34, 45

[56] References Cited
UNITED STATES PATENTS

| | | | |
|---|---|---|---|
| 3,073,400 | 1/1963 | Bauder et al. | 141/83 |
| 3,115,165 | 12/1963 | Cunningham, Sr. et al. | 141/83 |
| 3,368,593 | 2/1968 | Mamas | 141/83 |
| 3,648,741 | 3/1972 | Crosdale et al. | 141/83 X |
| 3,706,375 | 12/1972 | Raue | 177/123 X |

*Primary Examiner*—Richard E. Aegerter
*Assistant Examiner*—Frederick R. Schmidt
*Attorney, Agent, or Firm*—Crickenberger & Moore

[57] ABSTRACT

A method for filling containers with precise weights of meat comprising the steps of (*a*) adding meat chunks to produce an underweight coarse fill, (*b*) weighing to determine the shortage, (*c*) adding ground meat in precalculated extruded lengths, (*d*) weighing to determine weight errors to reject containers in case of underweight and to reduce the extruded lengths in case of overweight.

2 Claims, No Drawings

CAN-FILLING METHOD FOR MEAT-CANNING PROCESS

BACKGROUND OF THE INVENTION

In large scale canning operations the precise control of the filling of the cans is an important economic factor. If too much of an ingredient is added to a can and the error multiplied by many thousands of cans, the result is a substantial economic loss to the canner. Conversely, if the canner does not add the full amount of the ingredient as specified on the label, the consumer is deceived and the canner is subjected to the possibility of legal action by consumer groups or governmental authorities. When uniform liquid or dry ingredients are involved this problem is not serious since known methods can provide accurate control of such ingredients. The use of non-uniform materials such as meat chunks, however, presents particular problems because of the high cost of meat and the difficulty in controlling the addition of precise amounts which are often smaller than the available meat chunks.

In the past canners who have been faced with the problem of finely gauging the amounts of meat to be added to canned products such as beef stew have overfilled the cans with meat to a substantial degree rather than risk claims of underfilling.

SUMMARY OF THE INVENTION

The present invention provides a method for precisely controlling the amounts of meat to be added to a container during a canning operation. The empty can is first coarse-filled with meat chunks to produce a deliberate underweight amount of meat as compared to the desired weight. The can is weighed and the exact weight shortage of meat is ascertained. A second filling operation utilizes finely ground meat which is extruded into the can in a strip of uniform cross-section having a precalculated length which supplies the exact weight of meat needed to attain the desired total weight of meat. A second weighing operation produces an error control signal to reject the can in the case of underweight and to reduce the extruded meat added to subsequent cans in the case of overweight.

DESCRIPTION OF THE PREFERRED EMBODIMENT

The method of the present invention is utilized in a conveyor line canning operation. Two separate filling steps and two separate weighing steps are employed.

Meat cubes are first added in a major volumetric filling step which is designed to produce an underweight amount of meat chunks in the can. The can is then weighed to determine the exact amount by which the meat is under the desired weight of meat to be contained in the can. In addition to a supply of meat chunks to be used in the major or coarse filling operation, a supply of finely ground meat or hamburger must also be available to be used in the second filling step.

When the underweight error from the first filling step is determined, this information is utilized to add finely ground meat in precalculated extruded lengths. The extruded meat strip is uniform in cross-section so that the length of the extruded strip is directly proportional to the weight of the meat contained therein. In this fashion it is only necessary to know the length of the extruded meat strip added to the can in order to know the weight of the meat added.

After the second filling step, the can should contain the desired weight of meat within the accuracy of one-quarter ounce. As a further check on the accuracy a second weighing step is employed. If the final weight is not within the desired accuracy limits, the can is rejected if underweight, and the amount of meat extruded into subsequent cans is reduced by a scaling factor in the case of overweight.

The apparatus for carrying out the methods of the present invention may employ only conventional technology and is not a part of the present application. For example, the weighing system may employ a force-balance weighing system controlled by solid-state electronics and capable of producing electrical control signals proportional to the deviation from a given value. The extruding mechanism for the ground meat may be coupled to the weighing system by conventional feedback servoloop techniques to control automatically the length of extruded meat added to the cans in accordance with the deviation measured from the desired weight by the weighing system. The weighing system may also control a mechanical reject mechanism to remove from the conveyor line those cans which are not within the desired weight-accuracy limits.

What is claimed is:

1. A method for filling containers with precise weights of a non-uniform material comprising the steps of
   a. Adding a first predetermined amount of said material to produce a coarse fill under the desired final weight.
   b. Weighing the container and contents to determine preliminary weight shortage error,
   c. Preparing a fine mixture of said material,
   d. Extruding said material in a form having a substantially uniform predetermined weight per unit length,
   e. Measuring a length of extruded material to constitute a second predetermined amount of said material to compensate exactly for the preliminary weight shortage error, and
   f. Adding said second predetermined amount to produce an exact fill having the desired final weight.

2. The method of claim 1 including the further step of weighing the container and contents to determine the final weight error, if any, and
   rejecting the container in the case of underweight and reducing said second predetermined amount in subsequent containers in the case of overweight.

* * * * *